Patented Dec. 1, 1953

2,661,376

UNITED STATES PATENT OFFICE 2,661,376

DIRESORCYL SULFOXIDE AND PROCESS OF PREPARING THE SAME

Ann Pfahler Comer, Easton, Pa., and Ralph G. D. Moore, Phillipsburg, N. J., assignors to General Aniline & Film Corporation, New York, N. Y., a corporation of Delaware No Drawing. Application August 4, 1951, Serial No. 240,432

2 Claims. (Cl. 260—607)

This invention relates to 2,2′,4,4′-tetrahydroxydiphenyl sulfoxide (diresorcyl sulfoxide) and to a process of preparing the same.

The oldest and most common method for the preparation of dialkyl sulfoxides is the oxidation of dialkyl sulfides. The method consists of adding the theoretical amount of 30% hydrogen peroxide, nitric acid, chromic acid, perbenzoic acid, or hot aqueous potassium permanganate to a solution of the sulfide in glacial acetic acid or acetone and allowing the reaction mixture to stand at room temperature for several days. This method, however, gives low yields with diaryl sulfides, i. e., diphenyl sulfides.

Diaryl sulfoxides can be prepared in very good yields by the reaction of aryl derivatives with thionyl chloride in the presence of aluminum chloride or by the reaction of the Grignard reagent with thionyl chloride, alkyl sulfites, or sulfonyl chlorides. This process is difficult to apply to polyhydroxybenzenes since the hydroxyl groups may react with the sulfonyl chloride or thionyl chloride.

2,2′,4,4′-tetrahydroxydiphenyl sulfoxide, which for the sake of simplicity is better termed diresorcyl sulfoxide, and the process of preparing the same constitute the principal objects of the present invention.

The new compound which is characterized by the following formula:

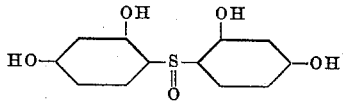

is of considerable value in the diazo printing process. It is an excellent shader for blue dyes for the production of blacks and is more satisfactory for this use than diresorcyl sulfide which appears to exert an undue affinity for the diazo compound. It is a coupler similar in its shades to resorcinol but with far less mobility in paper coating than resorcinol, a feature which is highly desirable in this type of printing.

It has been found that this new compound, diresorcyl sulfoxide, can be readily prepared by the oxidation of diresorcyl sulfide by means of 30% hydrogen peroxide in aqueous medium. The advantages of this process are greater simplicity of operation, cheapness since water is used as the solvent for the diresorcyl sulfoxide, and higher yields ranging from 70–80%, in comparison with 60% in acetic acid as a solvent medium.

In practicing the invention, a molecular equivalent of diresorcyl sulfide, prepared according to the method of Dunning et al., J. A. C. S. 53, pages 3466–9, 1931, is heated to 65–70° C. in sufficient water to dissolve most but not necessarily all the sulfide. To the suspension is added over a 15-minute period a molecular excess of 30% hydrogen peroxide with stirring. The temperature of the reaction mixture rises to 70–75° C., but higher temperatures should be avoided. The mixture is held at 65–70° C. for 2 hours to complete the oxidation and is then cooled and allowed to stand for some hours before filtering off the product. The yield ranges from 70% to higher than 80% of product with a melting point with decomposition of 160° C. or higher.

Our process will be more fully described in conjunction with the following example. It is to be understood, however, that the example is given by way of illustration and the invention is not to be limited by the details set forth therein.

25 grams of diresorcyl sulfide is heated with 100 ml. of water to 66.5° C. with stirring to effect solution of most of the solid. With continued stirring 14 ml. of 29.8% hydrogen peroxide is added over about 15 minutes. The temperature drops at first and then rises to a little over 70° C. Cooling is used, if necessary, to prevent a further rise. The diresorcyl sulfide dissolves completely. The color of the solution changes to reddish brown and after a few minutes fine crystals of sulfoxide start to separate. After an additional 15 minutes, the mixture is cooled and filtered after standing a few hours. The product is dried under reduced pressure and found to weigh 17.8 grams. It decomposed at 161° C. An additional crop of crystals is obtained from the mother liquor after it has stood several days. This weighs 1.1 grams, making a total yield of 18.9 grams or 71%.

While we have disclosed the preferred embodiments of our invention and the preferred modes of carrying the same into effect, it will be readily apparent to those skilled in this art that many variations may be made therein without departing from the spirit thereof. Accordingly, the scope of our invention is to be limited solely by the following claims.

We claim:
1. Diresorcyl sulfoxide having the following formula:

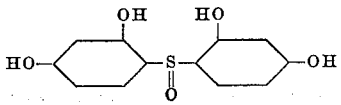

2. The process of preparing diresorcyl sulfoxide which comprises heating a molecular equivalent of diresorcyl sulfide with an excess over a molecular equivalent of 30% hydrogen peroxide in the presence of water at a temperature ranging from 65–75° C., cooling the reaction mixture, and recovering the diresorcyl sulfoxide.

ANN PFAHLER COMER.
RALPH G. D. MOORE.

References Cited in the file of this patent
UNITED STATES PATENTS

| Number | Name | Date |
|---|---|---|
| 2,560,049 | Cook | July 10, 1951 |